UNITED STATES PATENT OFFICE.

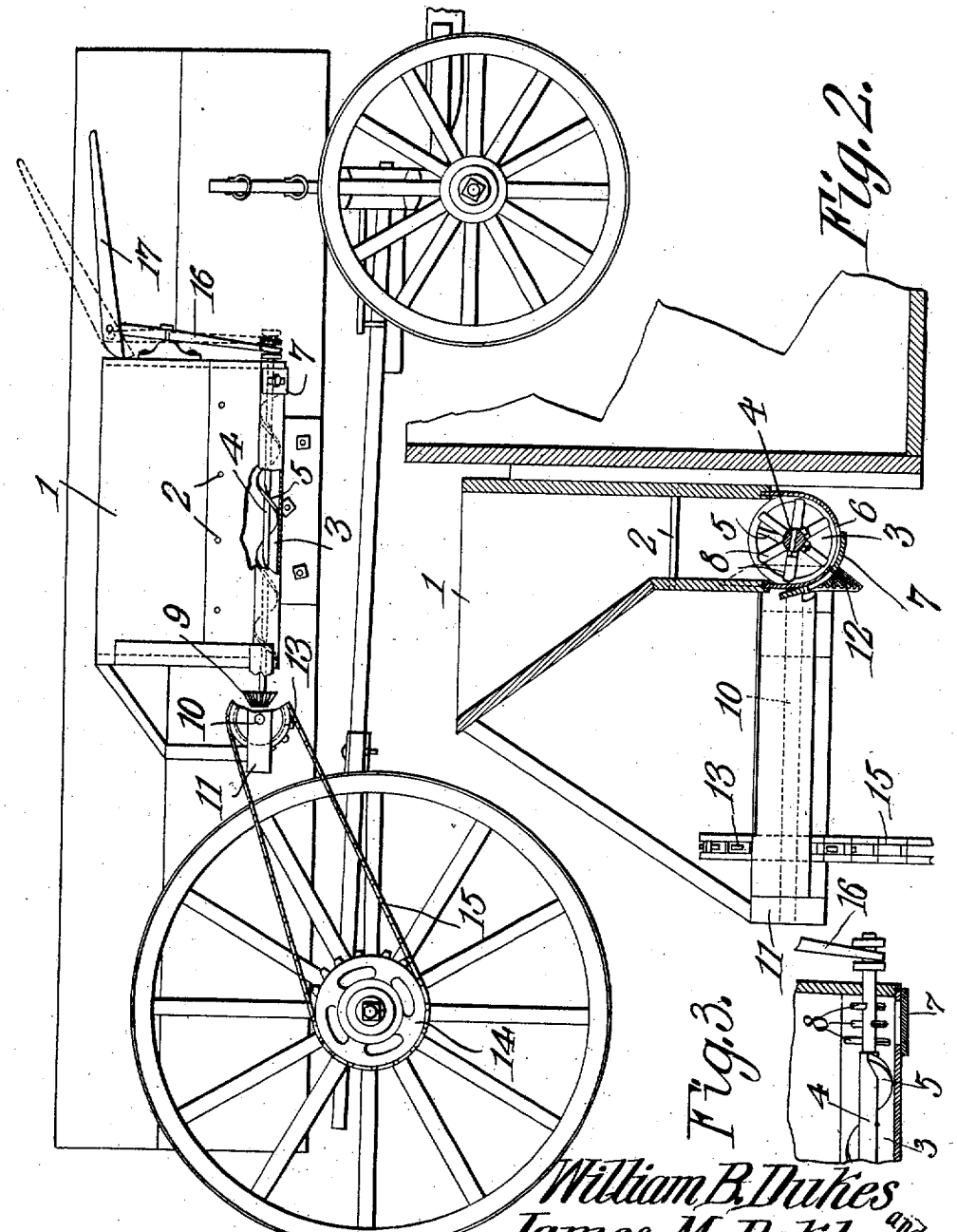

WILLIAM B. DUKES AND JAMES M. DEKLE, OF MOULTRIE, GEORGIA.

COMPOST AND COTTON-SEED DISTRIBUTER.

No. 857,518.      Specification of Letters Patent.      Patented June 18, 1907.

Application filed October 6, 1906. Serial No. 337,801.

*To all whom it may concern:*

Be it known that we, WILLIAM B. DUKES and JAMES M. DEKLE, citizens of the United States, residing at Moultrie, in the county of Colquitt and State of Georgia, have invented a new and useful Compost and Cotton-Seed Distributer, of which the following is a specification.

This invention has relation to distributers adapted to be attached to the side of a wagon body and operated by movement taken from one of the rear wheels of the vehicle for the purpose of distributing barn yard compost or cotton seed.

It consists primarily of a hopper into which the material is thrown from the wagon body said hopper being provided in its bottom with a number of bars which are adapted to divide or separate the material to a certain extent and below said hopper is located a trough in which is mounted for rotation a worm. The said trough is provided at one end with an outlet opening and on the worm shaft is located a series of cutting or disintegrating knives which operate above said outlet opening. A valve is provided for regulating the size of said opening and a lever mechanism is provided for throwing said worm shaft in or out of gear.

In the accompanying drawing:—Figure 1 is a side elevation of a wagon body with the distributer attached thereto showing parts broken away. Fig. 2 is a transverse sectional view of the distributer. Fig. 3 is a vertical sectional view of the lower corner of the distributer.

The device consists of a hopper 1 which is adapted to be attached to the side of a wagon body in advance or above one of the rear wheels thereof. The lower portion of the hopper is provided with the transversely extending parallel bars 2 and the worm trough 3 is attached to and constitutes the bottom of the hopper. The worm shaft 4 is journaled in the bottom of the hopper and extends longitudinally of the said trough 3. The said shaft 4 carries a worm 5. One end of the trough 3 is provided with an outlet opening 6 and the valve 7 is located upon the outer side of the said trough 3 and is adapted to be moved to regulate the size and the outlet capacity of the opening 6. The knives 8 are attached to the worm shaft 4 and operate above the outlet opening 6 of the trough 3. The bevel gear wheel 9 is attached to the worm shaft 4 beyond the rear end of the hopper 1. The counter-shaft 10 is journaled for rotation in the frame 11 and is provided with the bevel gear wheel 12 which normally is in mesh with the bevel gear wheel 9. The sprocket wheel 13 is fixed to the counter-shaft 10. The sprocket wheel 14 is of any suitable pattern and is attached to the hub of the rear wheel of the wagon. The sprocket chain 15 passes around the sprocket wheels 13 and 14. The worm shaft 4 is adapted to be shifted longitudinally.

The shifting lever 16 is fulcrumed to the forward end of the hopper 1. The lower end of the said lever engages the said shaft 4. The supplemental lever 17 is fulcrumed to the upper end of the shifting lever 16. The power end of the said lever 17 extends to within the vicinity of the conventional driver's seat (not shown) of the wagon while the work end of the said lever 17 is rounded and bears against the forward end of the hopper 1.

From the foregoing description it is obvious that as the wagon passes over the ground rotary motion is transmitted from the rear wheel to the worm 5. As the compost is deposited in the hopper 1 the bars 2 tend to separate the same and the said worm 5 also tears the same apart and works the material toward the outlet opening 6 of the through 3. From said opening the material falls to the ground and is pressed into the same by the rear wheels of the wagon. When it is desired that the attachment cease operating as above described, the levers 16 and 17 are manipulated to move the worm shaft 4 longitudinally, whereby the bevel gear wheel 9 is moved out of mesh with the bevel gear wheel 12. The knives carried by the worm shaft 4 separate the material so that the outlet opening of the trough 3 will not become choked up.

Having described our invention what we claim to be new and desire to secure by Letters Patent is:—

1. An attachment of the character as indicated comprising a hopper, a trough constituting the bottom thereof and having an outlet opening, a shaft carrying a worm located in said trough, means for rotating the said shaft, and knives attached to the shaft and being located over the outlet opening of the trough.

2. An attachment of the character as indicated comprising a hopper, a trough constituting the bottom thereof and having an outlet opening, a shaft carrying a worm located in said trough, means for rotating said shaft, and knives attached to the shaft and being located over the outlet opening of the trough, and means for moving said shaft longitudinally.

3. An attachment as described comprising a hopper, a trough constituting the bottom thereof and having an outlet opening, a shaft journaled for rotation and having a worm located in said trough, means for rotating said shaft, means for moving said shaft longitudinally consisting of a shifting lever fulcrumed to the hopper and engaging the shaft, a supplemental lever fulcrumed to the shifting lever and having its working end in engagement with the hopper.

4. An attachment as described comprising a hopper having in its lower portion transversely extending parallel bars, a trough constituting the bottom of the hopper and having an outlet opening, a worm shaft journaled for rotation in the hopper below the bars and carrying a worm located within the trough, knives attached to the worm shaft and operating above the outlet opening of the trough, and means for rotating said shaft.

5. An attachment as described comprising a hopper having in its lower portion transversely extending parallel bars, a trough constituting the bottom of the hopper and having an outlet opening, a worm shaft journaled for rotation in the hopper below the bars and carrying a worm located within the trough, knives attached to the worm shaft and operating above the outlet opening of the trough, means for rotating said shaft and means for moving said shaft longitudinally.

In testimony that we claim the foregoing as our own, we have hereto affixed our signatures in the presence of two witnesses.

WILLIAM B. DUKES.
JAMES M. DEKLE.

Witnesses:
L. B. DUKES,
W. S. STOKES.